Aug. 29, 1967                S. S. SADLER, JR                3,338,614
          VEHICLE BUMPER CONSTITUTING A PRESSURIZED
                   RECEPTACLE AND HITCH MEANS
                      Filed Oct. 22, 1965
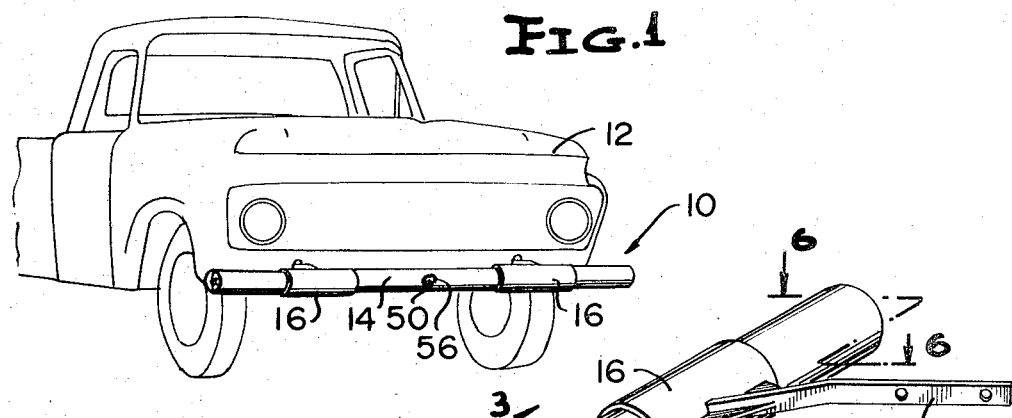
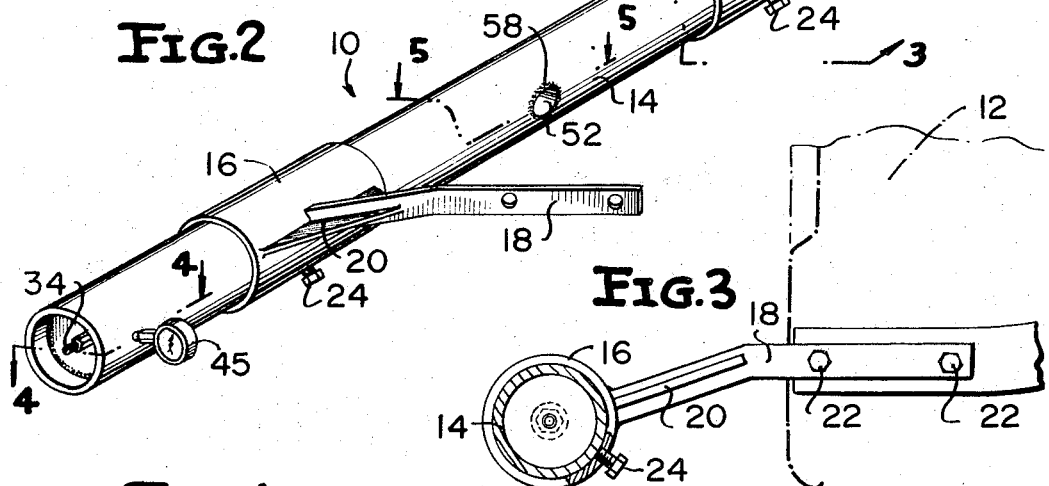
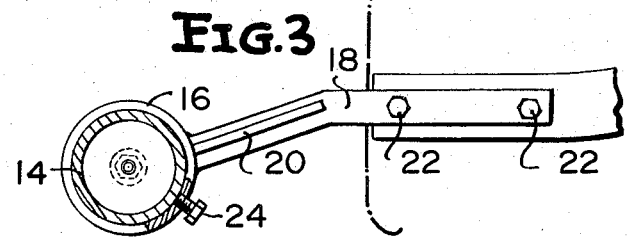
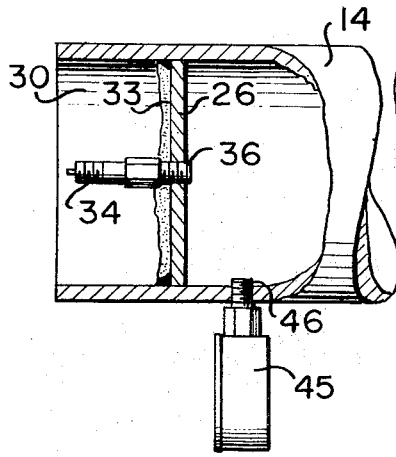
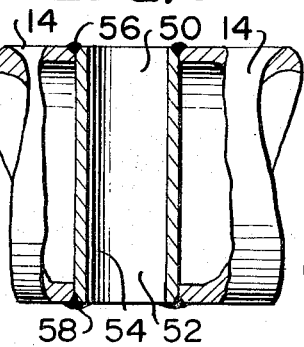
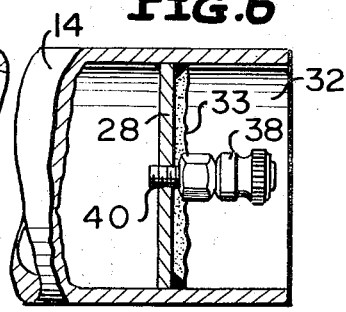
INVENTOR
SAMUEL S. SADLER, JR.
BY  *William H. Holt*
ATTORNEY United States Patent Office 3,338,614
Patented Aug. 29, 1967

3,338,614
VEHICLE BUMPER CONSTITUTING A PRESSURIZED RECEPTACLE AND HITCH MEANS
Samuel S. Sadler, Jr., Box 206, Tangerine, Fla. 32777
Filed Oct. 22, 1965, Ser. No. 500,815
4 Claims. (Cl. 293—69)

This invention relates to a novel combination of a vehicle bumper and gas container and more particularly to a novel construction whereby the gas container is easily attachable to and detachable from a vehicle.

It is to be understood that the term "vehicle" includes such mobile units as trucks, cars, tractors, trailers, house trailers, boats, houseboats and the like which are capable of being moved from place to place.

It is an object of this invention to provide a convenient supply of a desired gas such as butane or air under high pressure.

Another object of this invention is to provide a unique device which is particularly adapted to be attached to a vehicle and serves the dual utilitarian functions of being a vehicular bumper and a container for pressurized gas.

Another object of this invention is to provide a novel article of manufacture which is particularly useful in connection with vehicles around groves, orchards and farms or wherever it is desirable to have a readily available source of high pressure air for inflating pneumatic tires or for operating sprayers or other similar air-operated equipment.

Another object of this invention is to provide a bumper for a house trailer and the like wherein the bumper provides a supply of fuel for use with cooking equipment and the like.

A further object of this invention is to provide a tubular member which includes means for mounting the tubular member upon a vehicle for quick attachment to and detachment therefrom.

A still further object of this invention is to provide a tubular member for containing gas under pressure and including unique provision for recessing valve means in a protected location.

A further object of this invention is to provide a tubular member which includes a tube fixedly secured centrally of and transversely of the tubular member to provide a mounting for a conventional trailer hitch or tow-bar.

The above and other objects of this invention will become more clearly apparent from a consideration of the following detailed description, the appended claimed subject matter and the several views illustrated in the accompanying drawing.

In the drawing:

FIGURE 1 is a perspective view illustrating one use of the invention and shows a tubular member mounted upon a vehicle and serving as a bumper therefor.

FIGURE 2 is an enlarged perspective view of the tubulard member of FIGURE 1 capable of containing gas under pressure and having mounting means for attaching the tubular member to a desired location on a vehicle.

FIGURE 3 is a cross-sectional view taken on line 3—3 of FIGURE 2 and has portions broken away to illustrate the means for fixedly securing the tubular member to a tubular sleeve mounting.

FIGURE 4 is a partial sectional view, taken on line 4—4 of FIGURE 2, and shows the mounting of a filler valve and pressure gauge adjacent one end of the tubular member.

FIGURE 5 is a horizontal sectional view, taken on line 5—5 of FIGURE 2, and shows a tube fixed transversely of a central portion of the tubular member to provide a mounting for a trailer hitch and the like.

FIGURE 6 is a partial sectional view, taken on line 6—6 of FIGURE 2, and shows the mounting of a quick-couple air chuck valve recessed adjacent one end of the tubular member.

Referring to the drawing in detail, a combined bumper and container or gas bottle, generally indicated by the numeral 10, is shown as being mounted upon the front portion of a motor vehicle 12. It is to be understood that this showing is for illustrative purposes only since the combined bumper and container 10 is readily attachable to the rear of such vehicle and is not restricted to use with self-propelled vehicles but is also useful with house trailers and other types of drawn vehicles.

The bumper and container 10 includes a straight preferably cylindrical tubular member 14 which is formed of heavy-wall tubing capable of containing high pressure fluids, e.g., 160 p.s.i.g. or more, without rupturing or being distorted.

FIGURES 1, 2 and 3 illustrate a preferred construction for attaching the tubular member 14 to the vehicle 10. A pair of tubular sleeves 16 has mounting brackets 18 welded or otherwise secured thereto which are suitably reinforced by plates 20. The brackets 18 are attachable to the chassis of vehicle 12 by conventional means such as bolts 22.

Sleeves 16 have an inside diameter slightly greater than the outside diameter of the tubular member 14 so that the tubular member 14 is easily positionable in a central position relative to vehicle 12. Each of sleeves 16 is provided with a threaded opening for receiving a set-screw 24 to fixedly secure tubular member 14 therein.

As is clearly shown in FIGURES 2, 4 and 6, each end of tubular member 14 is closed by an end member 26 and 28, respectively. The end members 26 and 28 are located in recessed positions in spaced relation from the respective ends of tubular member 14, to provide concavities 30 and 32, and are shown as being circumferentially welded in place, at 33, to provide a hermetic seal to prevent escape of gas or other fluid from within.

A conventional filler valve 34 is shown as being centrally mounted on end member 26 and disposed within concavity 30 so as to be protected against inadvertent damage. Filler valve 34 is preferably screw threaded, at 36, and cooperates with threads in the end member 26 so that the filler valve 34 is removable to allow drainage of condensation from within the tubular member 14.

A known type of quick-couple air chuck 38 is mounted on end member 28 and disposed within concavity 32 so as to be protected against inadvertent damage thereto in the same manner as filler valve 34. The chuck 38 is adapted to be readily coupled to a hose or conduit (not shown) so that air or other gas can be transferred from within the tubular member 14 to the article or device which uses such air or gas, e.g., to the vehicle tires or sprayers in the case of air, or to a burner or torch in the case of inflammable gases.

The chuck 38 is preferably screw threaded, at 40, and cooperates with threads in the end member 28 so that the chuck 38 may be removed to allow drainage of condensation from within the tubular member 14.

A conventional pressure gauge 45 is connected to tubular member 14 by screw threading, at 46, and is in fluid communication with the interior thereof. It is to be noted that the adjacent sleeve 16 does not interfere with the gauge 45 during removal of tubular member 14 from the vehicle.

As is clearly shown in FIGURES 1, 2 and 5, tubular member 14 is provided centrally thereof with a pair of openings 50 and 52 which are disposed in alignment with each other preferably on a diameter of the tubular member 14. A tube 54, as is shown in FIGURE 5, is disposed within the tubular member 14 and extends transversely thereof in alignment with the openings 50 and 52 and is secured to the tubular member 14 by welds 56 and 58, respectively, which extend completely around the circumferences of openings 50 and 52 to provide a hermetic seal. The tube 54 is shown as being disposed substantially horizontal but it is to be understood that the tubular member 14 is adjustable within sleeves 16, by loosening set screws 24, so that tube 54 may be located in any desired orientation between vertical and horizontal.

Tube 54 may be approximately one inch in diameter and a trailer hitch (not shown) can be bolted onto the tubular member 14 with a single ¾ inch bolt and nut (not shown).

While preferred forms and arrangement of parts have been shown in illustrating the invention, it is to be clearly understood that various changes in details and arrangement of parts may be made without departing from the spirit and scope of the invention as defined in the appended claimed subject matter.

I claim:

1. A combination vehicle bumper and gas container comprising a rigid tubular member capable of containing high-pressure gas without causing deformation of said rigid tubular member, a pair of end members connected to said tubular member adjacent opposite ends thereof for hermetically sealing the interior of said tubular member from the surrounding atmosphere, said tubular member being centrally provided with a pair of openings therein in transverse alignment, a tube disposed within said tubular member and extending transversely thereof in alignment with said pair of openings, and means hermetically sealing said tube to said tubular member around each of said openings.

2. A combinatoin vehicle bumper and gas container comprising a rigid tubular member capable of containing high-pressure gas without causing deformation of said rigid tubular member, a pair of rigid end members connected to said tubular member adjacent opposite ends thereof for hermetically sealing the interior of said tubular member from the surrounding atmosphere, at least one of said pair of rigid end members being recessed inwardly from its respective end of said tubular member for defining a hollow cavity extending between said one end member and said respective end, and valve means mounted on said recessed end member, an outermost end of said valve means being within said hollow cavity, and said valve means communicating with the interior of said tubular member whereby gas may be placed within and removed from said interior.

3. A combination vehicle bumper and gas container as defined in claim 2 including mounting means for securing said vehicle bumper and gas container upon a vehicle, said mounting means comprising at least one tubular sleeve, said tubular member being mounted within said tubular sleeve and slidable relative thereto, and set-screw means threadedly carried by said tubular sleeve and engageable with said tubular member for precluding relative motion therebetween.

4. The combination as defined in claim 2 wherein said tubular member is centrally provided with a pair of openings therein in transverse alignment, a tube disposed within said tubular member and extending transversely thereof in alignment with said pair of openings, and means hermetically sealing said tube to said tubular member around each of said openings.

References Cited

UNITED STATES PATENTS

| | | | |
|---|---|---|---|
| 1,402,324 | 1/1922 | Van Gelder | 293—71 |
| 1,462,561 | 7/1923 | Lewandowski | 293—71 |
| 1,486,222 | 3/1924 | Berry | 293—69 |
| 1,552,965 | 9/1925 | Smith | 293—71 |
| 1,558,332 | 10/1925 | Basch | 293—71 |
| 1,709,949 | 4/1929 | Shoemaker | 293—71 |
| 1,832,512 | 11/1931 | Short | 293—69 |
| 1,995,088 | 3/1935 | Bellamy | 293—69 |

ARTHUR L. LA POINT, *Primary Examiner.*

H. BELTRAN, *Assistant Examiner.*